United States Patent

Suzuki et al.

[11] Patent Number: 5,102,061
[45] Date of Patent: Apr. 7, 1992

[54] BRUSHLESS ELECTRIC SIGNAL TRANSMITTING ROTARY DEVICE

[75] Inventors: Nobuhiko Suzuki; Itsuo Takayanagi; Hiromi Masuda, all of Shizuoka, Japan

[73] Assignee: Yazaki Corporation, Japan

[21] Appl. No.: 658,513

[22] Filed: Feb. 21, 1991

[30] Foreign Application Priority Data

Aug. 8, 1990 [JP] Japan .................. 2-84115[U]
Oct. 18, 1990 [JP] Japan ................. 2-108415[U]

[51] Int. Cl.⁵ .................. B60R 16/02; H01R 35/04
[52] U.S. Cl. .................................. 242/54 R; 310/71; 310/75 D; 439/15
[58] Field of Search ............... 74/413, 421 R, 484 R; 242/54 R, 85; 310/71, 75 D, 83; 361/398, 408; 439/13, 15, 16, 34

[56] References Cited

U.S. PATENT DOCUMENTS

| | | | |
|---|---|---|---|
| 3,822,834 | 7/1974 | Fjarlie | 242/54 R |
| 4,661,660 | 4/1987 | von Sothen et al. | 242/54 R |
| 4,844,359 | 6/1989 | Kato | 242/54 R |
| 4,893,037 | 1/1990 | Schwartz | 310/68 B |
| 4,925,122 | 5/1990 | Bannai | 242/54 R |
| 4,927,365 | 5/1990 | Schauer et al. | 439/15 |
| 4,928,901 | 5/1990 | Bannai et al. | 242/54 R |
| 5,023,498 | 6/1991 | Abe | 310/71 |

FOREIGN PATENT DOCUMENTS

3041257 6/1982 Fed. Rep. of Germany ........ 439/15
63-55191 11/1988 Japan.

*Primary Examiner*—Steven L. Stephan
*Assistant Examiner*—D. L. Rebsch
*Attorney, Agent, or Firm*—Wigman & Cohen

[57] ABSTRACT

The brushless signal transmitting device comprises a rotor; a fixed housing for rotatably supporting the rotor; at least one gear in mesh between the rotor and the fixed housing; an intermediate member disposed between the rotor and the fixed housing and rotatable in synchronism with and in the same direction as the rotor at a predetermined speed reduction ratio via the gear; a guide roller supported on the intermediate member; and a flexible wiring member connected between the rotor and the fixed housing. The wiring member is wound up around the rotor counterclockwise, for instance, and then returned via the guide roller so as to be wound up around the intermediate member clockwise. Since the intermediate member is larger in diameter but smaller in rotative speed than that of the rotor, it is possible to reduce the length of the flexible wiring member required to rotate the rotor by a predetermined number of revolutions of the rotor.

5 Claims, 3 Drawing Sheets

BRUSHLESS ELECTRIC SIGNAL TRANSMITTING ROTARY DEVICE

BACKGROUND OF THE INVENTION

1. Field of the Invention

The present invention relates to a brushless electric signal transmission device, and more specifically to an improvement in a brushless electric signal transmission device for transmitting/receiving electric signals between a fixed body and a rotatable body reciprocatively (clockwise or counterclockwise) rotated within a predetermined number of rotations, which is suitable for use in a steering apparatus for an automotive vehicle, for instance.

2. Description of the Prior Art

FIGS. 1(a) and 1(b) shows an example of prior-art brushless electric signal transmitting device, in which a rotatable body (i.e. cylindrical rotor) 101 is rotatably disposed at a center of a fixed body (i.e. hollow cylindrical housing) 102 concentrically to each other with an annular space between the two. Within this space, a flexible electric wiring member 103 is wound by plural turns around the outer circumference of the rotor 101, and an inner end of the wiring member 103 is fixed to the rotor 101 and an outer end of the wiring member 103 is fixed to the housing 102.

The flexible wiring member 103 is a belt-like flexible printed circuit board (e.g. harness), for instance to connect electrical parts provided on the rotor 101 to other electric parts provided on the fixed housing 102, respectively through the conductive pattern of the electric wiring member 103.

Further, FIG. 1(a) shows a state where the electric wiring member 103 is full wound u counterclockwise around the rotor 101 by M turns in such a way as to be brought into close contact with the outer circumference of the rotor 101, and therefore only the outer end 103a of the wiring member 103 is connected to the fixed housing 102. In this state it is impossible to further wind up the rotor 101 counterclockwise relative to the fixed housing 102. On the other hand, FIG. 1(b) shows a state where the electric wiring member 103 is full wound off clockwise around the rotor 101 by N turns in such a way as to be brought into close contact with the inner circumference of the fixed housing 102, and therefore only the inner end 103b of the wiring member 103 is connected to the rotor 101. In this state, it is impossible to further wind off the rotor 101 clockwise relative to the fixed housing 102.

In the prior-art device as described above, however, there exists a problem in that when the number of rotations of the rotor 101 is required to increase relative to the fixed housing 102, the length of the flexible wiring member 103 inevitably increases and therefore the flexible wiring member 103 increases both in electric resistance and cost.

In more detail, for example when the wiring member 103 is wound up around the rotor 101 counterclockwise by 3 turns and the rotor 101 is wound off clockwise by 1 turn, the number of remaining turns of the wiring member 103 around the rotor 101 is 2(=3−1). In general, when the wiring member 103 is wound up counterclockwise around the rotor 101 by M turns at the first and the rotor 101 is wound off clockwise by X turns, the number of remaining turns N of the wiring member 103 around the rotor 101 can be expressed as N=M−X.

Further, when the wiring member 103 is full wound off, the wiring member 103 is brought into tight contact with the inner circumference of the fixed housing 102. Therefore, if the number of the tight turns in the full wind-off condition is denoted as N, and the number of the tight turns in full wind-up condition is denoted as M, the required length $L_2$ of the prior-art wiring member 103 can be roughly expressed as $$L_2 = \pi d_1 M = \pi d_2 N = \pi d_2 (M-X)$$

where $d_1$ denotes the outer diameter of the rotor 101, and $d_2$ denotes the inner diameter of the fixed housing 102. Therefore, $$M = \{d_2/(d_2-d_1)\}X$$

That is, $L_2$ can be rewritten as $$L_2 = \pi d_1 \{d_2/(d_2-d_1)\}X$$

To overcome the above-mentioned problems, Japanese published Examined (Koho) Patent Appli. No. 63-5519 discloses a structure such that planetary gears are provided so as to revolve around and in mesh with the rotor, and an electric wiring member is supported by a reel disposed coaxially with the planetary gears, in order to reduce the effective length of the flexible wiring member.

In this prior-art structure, however, since the middle portion of the electric wiring member is supported by the planetary reel, there exist various problems as follows: the wiring member tends to be bent at the middle portion; the wiring member is subject to damage; the flexibility and the durability of the wiring member itself deteriorate because the wiring member is wound up or off around a relatively small-diameter planetary reel; a higher load tends to be applied to the contact portion between the housing and the wiring member so that the connection between the two is not stable.

SUMMARY OF THE INVENTION

With these problems in mind, therefore, it is the primary object of the present invention to provide a brushless electric signal transmitting device, which can reduce the effective length of the wiring member, without reducing the number of rotations of the rotor and without sharply bending the wiring member.

To achieve the above-mentioned object, the brushless electric signal transmitting device according to the present invention comprises: a rotor (10, 30); a fixed housing (12, 34) for rotatably supporting said rotor; at least one gear (20, 22, 44) in mesh between said rotor and said fixed housing; an intermediate member (16, 40) disposed within a space between said rotor and said fixed housing and rotatable in synchronism with and in the same direction as said rotor at a predetermined speed reduction ratio via said gear; at least one guide roller (26, 48) rotatably supported on said intermediate member; and a flexible wiring member (14) windingly disposed between said rotor and said fixed housing, said wiring member being wound up around said rotor in a first rotative direction and then, returned via said guide roller so as to be wound up around said intermediate member in a second direction opposite to the first direction.

In the first embodiment, the intermediate member is formed with a cylindrical wall (16b) and said guide roller (26) is rotatably disposed near an opening (24) formed in said cylindrical wall, said flexible wiring member being wound up around said rotor in an annular space radially inside said guide roller and wound off around said cylindrical wall in an annular space radially outside said guide roller, and the at least one gear includes a first intermediate gear (20) rotatably supported on said fixed housing in mesh with said rotor and a second intermediate gear (22) rotatably supported on said fixed housing in mesh between said first intermediate gear and said intermediate member. In the second embodiment, the intermediate member is provided with a plurality of circularly-arranged guide rollers (48), said flexible wiring member being wound up around said rotor in an annular space radially inside said guide rollers and wound off around said circularly-arranged guide rollers in an annular space radially outside said guide rollers and said at least one gear includes a plurality of planetary gears (44) rotatably supported on said intermediate member and movable along an annular groove (38) formed between said rotor and said fixed housing in mesh between said rotor and said fixed housing.

In the brushless electric signal transmitting device according to the present invention, since the flexible wiring member wound off from the rotor can be wound up around the intermediate member or the circularly arranged guide rollers having a diameter larger than that of the rotor at a rotative speed smaller than that of the rotor, it is possible to reduce the length of the flexible wiring member required to rotate the rotor clockwise or counterclockwise by a predetermined number of revolutions of the rotor, as compared with the prior-art device which simply includes a rotor, a fixed housing, and a flexible wiring member windingly connected between the two.

BRIEF DESCRIPTION OF THE DRAWINGS

FIGS. 1(a) and (b) are plan views for assistance in explaining a prior-art electric signal transmitting device, in which FIG. 1(a) shows the state where the rotor is wound up full counterclockwise and FIG. 1(b) shows the state where the rotor is wound off full clockwise;

DETAILED DESCRIPTION OF THE PREFERRED EMBODIMENTS

Embodiments of the brushless electric signal transmitting device according to the present invention will be described hereinbelow with reference to the attached drawings.

The basic concept of the present invention is to provide an intermediate plate or member rotated by the rotor in the same rotative direction but at a rotative speed lower than that of the rotor, so that the wiring member can be wound up or off around the intermediate plate having a diameter larger than that of the rotor in order to reduce the effective length of the wiring member.

Figure 1A:
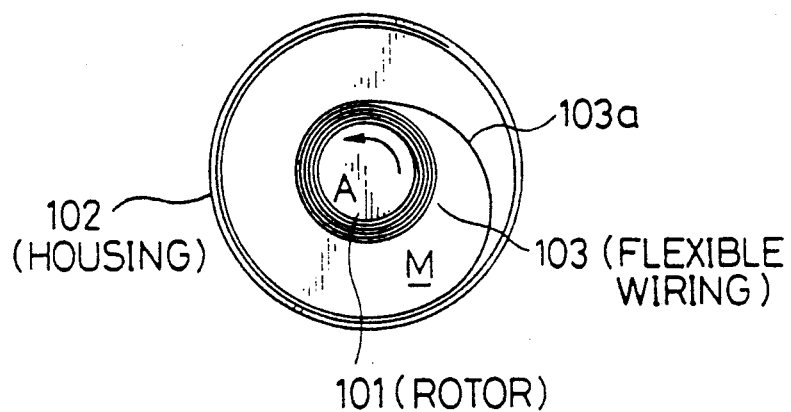
Figure 1B:
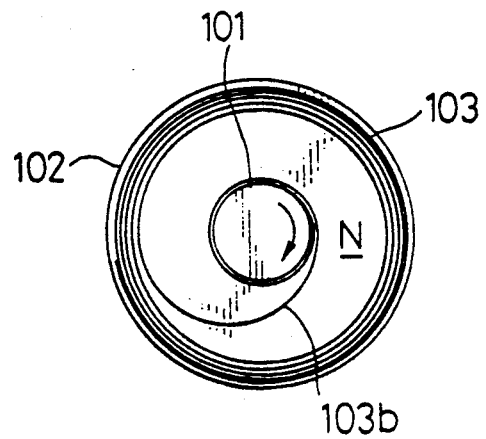
Figure 2:
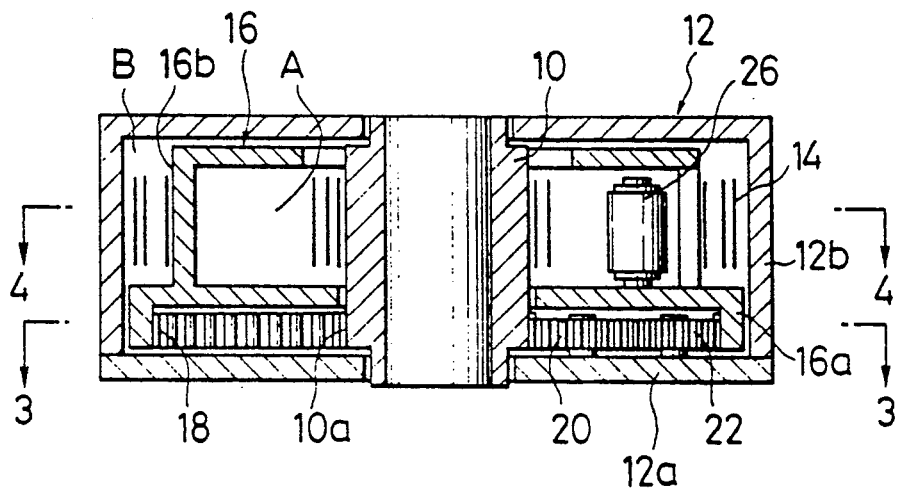
FIG. 2 is a longitudinal cross-sectional view showing a first embodiment of the electric signal transmitting device according to the present invention.
Figure 3:
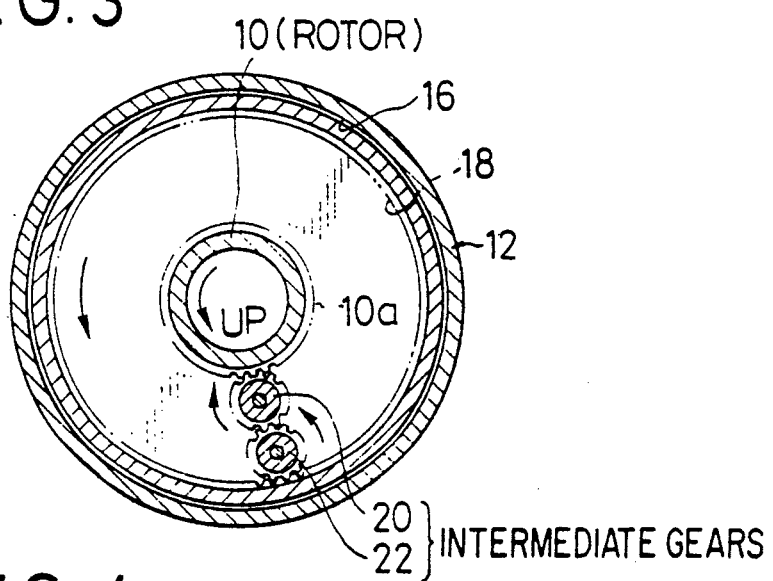
FIG. 3 is a cross-sectional view taken along the line 3—3 shown in FIG. 2.
Figure 4:
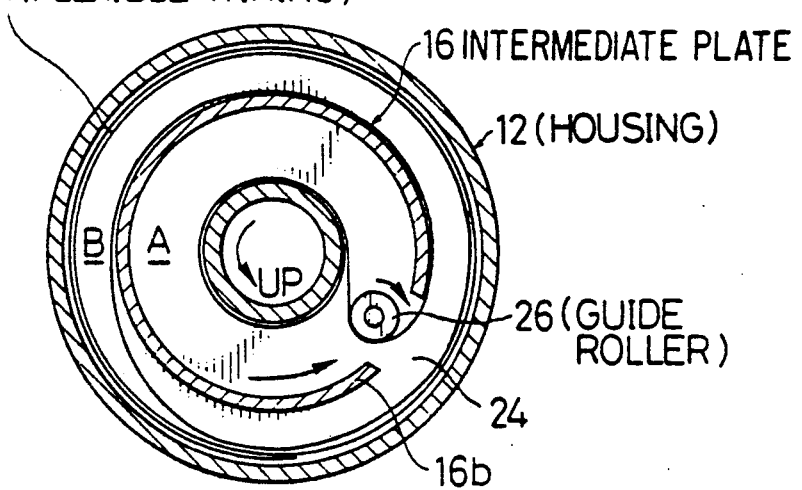
FIG. 4 is a cross-sectional view taken along the line 4—4 shown in FIG. 2.

FIGS. 2, 3 and 4 show a first embodiment of the device according to the present invention. In the drawing, the device comprises a rotor 10 rotated in synchronism with a steering shaft (not shown) for instance, a fixed housing 12 for rotatably supporting the rotor 10 concentrically therewith; an annular intermediate plate 16 rotatably provided within a space between the rotor 10 and the fixed housing 12, two intermediate gears 20 and 22 rotatably supported on the fixed housing 12 and between the rotor 10 and the intermediate plate 16, a guide roller 26 rotatably disposed on the intermediate plate 16, and a flexible wiring member 14.

The fixed housing 12 is composed of an annular bottom plate 12a and a cylindrical cap cover 12b formed with an opening (not shown) through which the wiring member 14 is led out so as to be connected to external circuits. Further, an inner end of the wiring member 14 is fixed to the outer circumference of the rotor 10, and an outer end of the wiring member 14 is fixed to the inner circumference of the fixed housing 12. The intermediate plate 16 is formed with an annular bottom plate 16a rotatably connected to the rotor 10 via the two gears 20 and 22 and a cylindrical wall 16b axially extending from the bottom plate 16a around which the flexible wiring member 14 is wound up or off.

An outer circumferential gear 10a is formed lower outer circumferential surface of the rotor 10. An inner circumferential gear 18 is formed at the lower inner circumferential surface of the bottom plate 16a of the intermediate plate 16. The two intermediate gears 20 and 22 are disposed between the rotor 10 and the intermediate plate 16 in mesh with these outer and inner gears 10a and 18, respectively.

Therefore, when the rotor 10 is rotated counterclockwise (wind-up direction) as shown in FIG. 3, since the first intermediate gear 20 rotates clockwise and the second intermediate gear 22 rotates counterclockwise, the intermediate plate 16 is also rotated counterclockwise because these two intermediate gears 20 and 22 are rotatably supported on the bottom plate 12a of the fixed housing 12. Here, it should be noted that the intermediate plate 16 rotates in the same rotative direction as that of the rotor 10 and at a speed lower than that of the rotor 10, but the circumferential speed of the rotor 10 is the same as that of the intermediate plate 16 when the gear ratio of the two gears 20 and 22 is 1.

Further, the speed reduction ratio of the intermediate plate 16 to the rotor 10 can be adjusted by appropriately determining the diameters (i.e. a gear ratio) of these two intermediate gears 20 and 22. In the case where the diameters of the two intermediate gears 20 and 22 are equal to each other, the rotative speed ratio of the rotor 10 to the intermediate plate 16 is reduced as $d_1/D_2$, where $d_1$ denotes the outer diameter of the rotor 10 and $D_2$ denotes the inner diameter of the intermediate plate.

Further, a guide roller 26 is rotatably supported on the intermediate plate 16. The flexible wiring member 14 whose inner end is fixed to the inner circumference of the rotor 10 is half wound around the guide roller 26 and then wound around the outer circumference of the intermediate plate 16, as shown in FIG. 4. The outer end of the flexible member 14 is fixed to the inner circumference of the fixed housing 12. Further, the space between the rotor 10 and the fixed housing 14 is divided into an inner wind-up chamber A and an outer wind-off chamber B by the cylindrical wall 16b. An opening 24 through which the wiring member 14 is passed is formed at a part of the cylindrical wall 16b of the intermediate plate 16.

The winding up/off operation of the flexible wiring member 14 will be explained hereinbelow. When the rotor 10 is rotated counterclockwise in FIG. 4, since the intermediate plate 16 is also rotated in the same counterclockwise direction, the flexible wiring member 14 is wound up around the outer circumference of the rotor 10 through the rotatable guide roller 26 via the cylindrical wall 16b of the intermediate plate 16, so that the flexible wiring member 14 is shifted from the outer wind-off chamber B to the inner wind-up chamber A. Here, it should be noted that the wiring member 14 will not slip on the cylindrical wall 16b of the intermediate member 16.

On the other hand, when the rotor is rotated clockwise in FIG. 4, since the intermediate plate 16 is also rotated in the same clockwise direction, the flexible wiring member is wound off around the inner circumference of the fixed housing 12 through the rotatable guide roller 26 via the cylindrical wall 16b of the intermediate plate 16 without slip, so that the flexible wiring member 14 is shifted from the inner wind-up chamber A to the outer wind-off chamber B.

In the above-mentioned operation, although the rotative speed of the intermediate plate 16 is smaller than that of the rotor 10, that is, the reduction speed ratio of the rotor 10 to the intermediate plate 16 is $d_1/D_2 < 1$, since the circumferential speed of the rotor 10 is equal to that of the intermediate plate 16, the flexible wiring member 14 is wound up or off around the intermediate plate 16 without being subjected to tension or looseness, as far as the gear ratio of the two intermediate gears 20 and 22 is 1.

For example, when the rotor 10 is wound off by 360 degrees, the intermediate plate 16 rotates by $(d_1/D_2) \times 360$ degrees. In this case, the wind-off distance of the wiring member 14 from the device can be expressed as $$\pi d_1 - \pi d_1 \times (d_1/D_2) = \pi d_1 (1 - d_1/D_2)$$

Therefore, if the rotor 10 rotates by X turns, the wind-off distance $L_1$ of the wiring member 14 is $$L_1 = \pi d_1 (1 - d_1/D_2) \cdot X$$

The ratio of the prior-art length $L_2$ and the invention length $L_1$ required when the rotor is rotated by X turns is $L_2$ (prior art):$L_1$ (invention)
 $= \pi d_1 \{d_2/(d_2 - d_1)\} X : \pi d_1 (1 - d_1/D_2) X$
 $= 1/(1 - d_1/d_2):1 - d_1/D_2$
 since $d_2 > d_1$ or $D_2 > d_1$, $L_2 > L_1$ Therefore, it is possible to reduce the invention length $L_1$ of the flexible wiring member 14 required when the rotary is rotated by a predetermined number of revolutions, as compared with the prior art length $L_2$.

Figure 5:
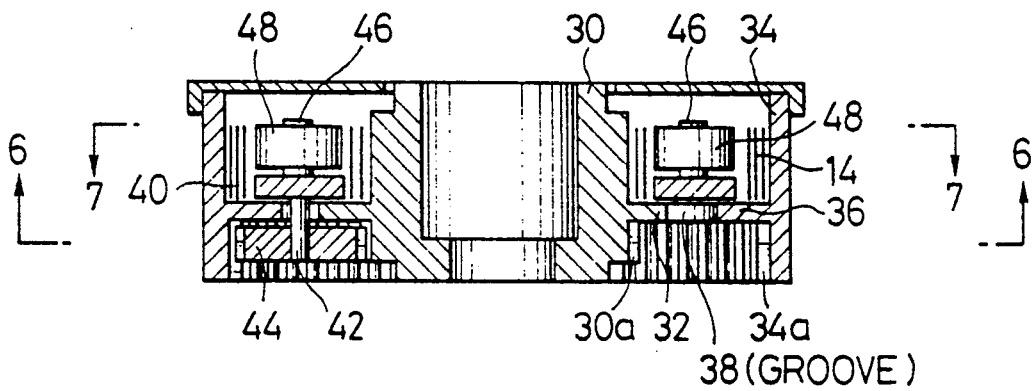
FIG. 5 is a longitudinal cross-sectional view showing a second embodiment of the electric signal transmitting device according to the present invention.
Figure 6:
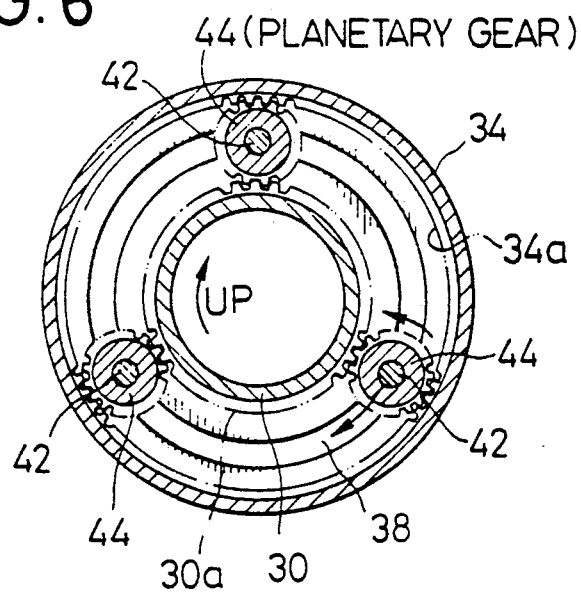
FIG. 6 is a cross-sectional view taken along the line 6—6 shown in FIG. 5.

FIGS. 5 to 6 show a second embodiment of the present invention. In this embodiment, the rotor 30 is formed with an outwardly extending partition (flange) 32 and the fixed housing 34 is formed with an inwardly extending portion 36 so as to form an annular groove 38 between the two partitions. Between these two partitions 32 and 36, an annular intermediate plate or member 40 is rotatably supported. That is, three axles 42 are fixed to the lower surface of the intermediate plate 40 at regular angular intervals of 120 degrees so as to pass through the groove 38 as shown in FIG. 6. Three planetary gears 44 are rotatably supported by these three axles 42, respectively so as to be geared with an outer gear 30a formed at the lower outer circumference of the rotor 30 and an inner gear 34a formed at the lower inner circumference of the fixed housing 34. Therefore, when the rotary 30 is rotated clockwise, for instance, since the three planetary gears 44 rotate counterclockwise, the intermediate plate 40 is also rotated clockwise as shown in FIG. 6.

Further, a plurality of axles (eight in FIG. 7) 46 are arranged on the intermediate plate 40 at regular intervals, and a plurality of guide rollers 48 are rotatably supported by the axles 46, respectively.

The inner end of the flexible wiring member 14 is fixed to the outer circumference of the rotor 30, and the outer end of the wiring member 14 is half wound up around any one of the guide rollers 48 and then wound up around the outermost circumferential contact points of the plural guide rollers 48. The outer end of the flexible wiring member 14 is fixed to the inner circumference of the fixed housing 34.

Figure 7:
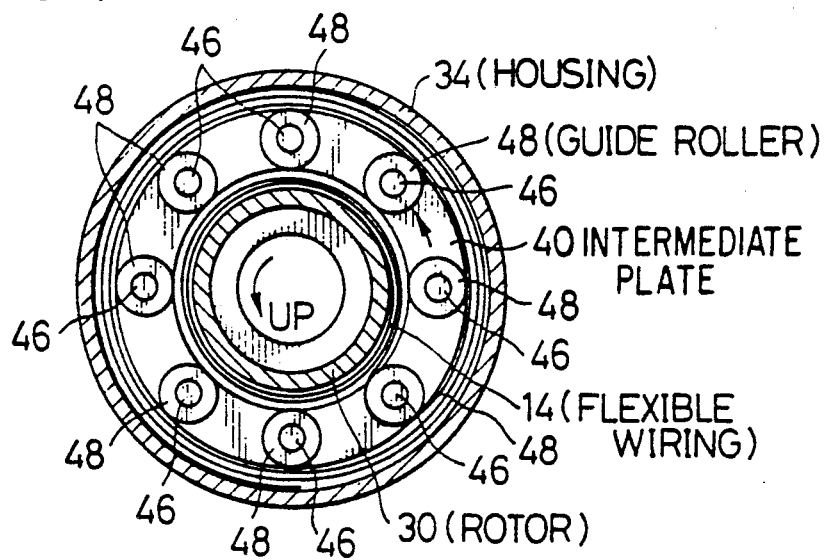
FIG. 7 is a cross-sectional view taken along the line 7—7 shown in FIG. 5.

In this embodiment, when the rotor 30 is rotated counterclockwise in FIG. 7, the flexible wiring member 14 is wound up within the inner space between the rotor 30 and the guide rollers 48. When the rotor 30 is rotated clockwise, the flexible wiring member 14 is wound off within the outer space between the guide rollers 48 and the fixed housing 34. Further, since the circumferential speed of the rotor 10 is equal to that of the intermediate plate 16, the flexible wiring member 14 is wound up or off around the intermediate plate 40 without being subjected to tension or looseness.

In this embodiment, when the wiring member 14 is wound off from the rotor 30, although the wiring member 14 is brought into contact with the guide rollers 48, since these rollers 48 are rotatable, the wiring member 14 is more smoothly shifted from the inner space to the outer space of the guide rollers or vice versa. Further, in this embodiment, since the wiring member 14 can be half wound around any one of the guide rollers 48, the wiring member 14 can be easily assembled into the fixed housing 34. Further, since the wiring member 14 can be wound up or off around the rotor in contact with the outer circumferences of the guide rollers 48, the rotor 30 can be more smoothly rotated within the fixed housing 34.

As described above, in the brushless electric signal transmitting device according to the present invention, since the flexible wiring member wound off from the rotor can be wound up around the intermediate member or the circularly arranged guide rollers having a diameter larger than that of the rotor and moving at a rotative speed smaller than that of the rotor (the circumferential speed is the same in both), the length of the wiring member required to rotate the rotor by a predetermined number of revolutions can be reduced as compared with the conventional device, thus reducing the electric resistance and the cost of the flexible wiring member.

Further, since the flexible wiring member is wound up via the intermediate plate or the circularly arranged guide rollers having a relatively large diameter, it is possible to prevent the flexible wiring member from being bent sharply and therefore damaged, without exerting harmful influence upon the flexibility or the durability of the wiring member.

Further, when the flexible wiring member is wound up or off in contact with the plural guide rollers (in the second embodiment), it is possible to reduce the friction between both the surfaces of the flexible wiring member and therefore to more smoothly rotate the rotor, while facilitating the assembly work.

What is claimed is:

1. A brushless signal transmitting device, comprising:
   (a) a rotor;
   (b) a fixed housing for rotatably supporting said rotor;
   (c) at least one gear in mesh between said rotor and said fixed housing;
   (d) an intermediate member disposed within a space between said rotor and said fixed housing and rotatable in synchronism with and in the same direction as said rotor at a predetermined speed reduction ratio via said gear;
   (e) at least one guide roller rotatably supported on said intermediate member; and
   (f) a flexible wiring member windingly disposed between said rotor and said fixed housing, said wiring member being wound up around said rotor in a first rotative direction and then returned via said guide roller so as to be wound up around said intermediate member in a second direction opposite to the first direction.

2. The brushless signal transmitting device of claim 1, wherein said intermediate member is formed with a cylindrical wall and said guide roller is rotatably disposed near an opening formed in said cylindrical wall, said flexible wiring member being wound up around said rotor in an annular space radially inside said guide roller and wound off around said cylindrical wall in an annular space radially outside said guide roller.

3. The brushless signal transmitting device of claim 2, wherein said at least one gear includes:
   (a) a first intermediate gear rotatably supported on said fixed housing in mesh with said rotor; and
   (b) a second intermediate gear rotatably supported on said fixed housing in mesh between said first intermediate gear and said intermediate member.

4. The brushless signal transmitting device of claim 1, wherein said intermediate member is provided with a plurality of circularly-arranged guide rollers, said flexible wiring member being wound up around said rotor in an annular space radially inside said guide rollers and wound off around said circularly-arranged guide rollers in an annular space radially outside said guide rollers.

5. The brushless signal transmitting device of claim 4, wherein said at least one gear includes a plurality of planetary gears rotatably supported on said intermediate member and movable along an annular groove formed between said rotor and said fixed housing in mesh between said rotor and said fixed housing.

* * * * *